2,943,102
Patented June 28, 1960

2,943,102

MANUFACTURE OF ALKYL ALUMINUM COMPOUNDS

John T. Balhoff, Baton Rouge, La., assignor to Ethyl Corporation, New York, N.Y., a corporation of Delaware No Drawing. Filed Feb. 24, 1959, Ser. No. 794,865

6 Claims. (Cl. 260—448)

This invention relates to the manufacture of organo aluminum compounds and more particularly to the preparation of alkyl aluminum compounds.

Alkyl aluminum compounds, including trialkyl aluminum and the dialkyl aluminum mono-hydride derivatives thereof have recently become of great commercial importance as catalysts in the manufacture of polymers, such as polyethylene and polypropylene, and in the preparation of long-chain alcohols. These alkyl aluminum compounds have not been capable of preparation directly from aluminum, hydrogen and the corresponding olefin but have, instead, been prepared by indirect and more costly routes.

It is an object of the present invention to provide a new, effective process for the manufacture of alkyl aluminum compounds. More particularly, it is an object of this invention to provide an economic and simple process wherein aluminum metal is reacted directly with hydrogen and an olefin to form the corresponding alkyl aluminum compound. A specific object of this invention is to provide a process for the manufacture of both trialkyl aluminum and dialkyl aluminum hydrides. Other objects and advantages of this invention will be more apparent from the following description and appended claims.

It has now been found that aluminum metal can be reacted directly with hydrogen and an olefin if the reaction is carried out using catalytic quantities of an organic peroxide. The product can be controlled by controlling the ratio of hydrogen and olefin employed, varying from substantially pure trialkyl aluminum when using high concentrations of the olefin to as much as 60 percent of the mono-hydride derivative thereof at higher hydrogen concentrations. When employing equimolar quantities, the product contains about two-thirds of the trialkyl aluminum and the remainder the dialkyl aluminum hydride. In general, the relative concentration is from 0.01 to 10 moles of hydrogen per mole of olefin.

The olefins which are especially suitable for the present invention are those containing from 2 to 20 carbon atoms. While any olefin is suitable, somewhat greater reaction rates are obtained with mono-olefins having the unsaturated in the "1" position, i.e. α-olefins. Ethylene and isobutylene are especially preferred in this process due to their availability and the demand for the corresponding organo aluminum products, that is triethyl aluminum and triisobutyl aluminum (and their corresponding hydrides). Typical examples of other compounds that can be made by the process of this invention include triisopropyl aluminum, tri-n-propyl aluminum, tri-n-butyl aluminum, trihexyl aluminum, trioctyl aluminum, tri-n-dodecyl aluminum, the dialkyl aluminum mono-hydrides containing the corresponding alkyl groups, and other trialkyl and dialkyl aluminum hydride compounds having alkyl groups each containing up to about 20 carbon atoms. In some cases, it is desirable to feed more than one olefin in the process, thereby forming mixed alkyl aluminum compounds.

More particularly, the process of this invention comprises reacting aluminum, hydrogen and an olefin in contact with an organic peroxide at a temperature of between about 0° and 300° C., employing an elevated hydrogen pressure. With gaseous olefins, it is also desirable to maintain an olefin partial pressure, depending particularly on the distribution of hydride desired in the product. In general, total pressures can be employed from about 0 to 50,000 p.s.i.g. or higher.

The reaction is normally conducted in an inert liquid medium in order to simplify processing, although such a liquid is not necessary for operability of the process. In fact, a gaseous olefin and hydrogen can be reacted directly with solid aluminum with the aid of an organic peroxide. However, when a liquid olefin is employed in the reaction, it is frequently desired to use excess quantities of the olefin as the liquid medium.

Especially excellent reaction is obtained when the elemental aluminum is employed in a highly subdivided form. Best results are obtained with aluminum powder having an average particle size less than 100 microns and preferably below about 25 microns. Such subdivision of the aluminum can be obtained conveniently by milling or grinding commercial powders or dust, such as in a ball, hammer or ring roller mills or by machining or the like. These grinding operations are best conducted in an inert atmosphere, preferably under an inert liquid, and in the presence of the organic peroxide catalyst. In the absence of the peroxide, the aluminum metal is malleable and tends to flake or sheet out upon mechanical working. Thus, the organic peroxide serves the dual function (in addition to acting as a catalyst) of preventing sheeting out of the metal and permitting extremely fine subdivision of the metal. In most instances, the aluminum after subdivision in a mill or the like in the presence of the peroxide is jet black and is actually pyrophoric. For this reason, it must be protected from contact with either water or air. Other mechanical attrition techniques, such as high-speed stirring, can be used to obtain similar results.

The organic peroxides useful in the process of this invention can be of a wide variety of types, including hydroperoxides, dialkyl and diaralkyl peroxides, peroxy acids, peroxy esters, diacyl and diaroyl peroxides and peroxy derivatives of aldehydes and ketones. The aralkyl and the aroyl peroxides give optimum results. These peroxides contain the radicals

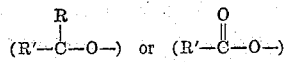

and include such examples as α-methyl-benzyl hydroperoxide, cumene hydroperoxide, α-methyl-α-ethyl benzyl hydroperoxide, α-p-xylyl hydroperoxide, ethyl peroxyacetate, diethyl peroxyterephthalate, dibenzoyl peroxide, bis(p-methoxybenzoyl)peroxide, p-monomethoxybenzoyl peroxide, bis(p-nitrobenzoyl)peroxide and the like. Best results are obtained with organoperoxides having alkyl and/or aryl groups, each containing not more than about 15 carbon atoms, and preferably not greater than six carbon atoms. Many examples of peroxides of the above type are given in the text "Organic Peroxides," Arthur V. Tobolsky et al., Interscience Publishers, Inc., New York, 1954. Additional examples of peroxides for this invention are t-butyl hydroperoxide, diisopropylbenzene hydroperoxide, menthane hydroperoxide, p-t-butylcumene hydroperoxide, ditertiary butyl peroxide, hydroxyheptaldehyde peroxide, dibenzal diperoxide, methyl amyl ketone peroxide, cyclohexanone peroxide, acetyl peroxide, p-chlorobenzoyl peroxide, peracetic acid, tertiarybutyl peracetate, tertiarybutyl perbenzoate, ditertiary butyl diperphthalate, tertiarybutyl permaleic acid, tertiary butyl perphthalic acid, diisopropyl peroxydicarbonate, Other examples of suitable organic peroxides according to this invention are ethyl hydroperoxide, 1,1-diethylpropyl hydroperoxide, 1-methylhexyl hydroperoxide, cyclohexyl hydroperoxide, 2-cyclopenten-1-yl hydroperoxide, 2-methyl-2-cyclohexen-1yl hydroperoxide, 9-fluorenyl hydroperoxide, tetrahydro-2-furyl hydroperoxide, methyl ethyl peroxide, diisopropyl peroxide, di-t-amyl peroxide, ditriphenylmethyl peroxide, peroxyformic acid, peroxypropionic acid, peroxycaproic acid, peroxybenzoic acid, dibenzoyl peroxide, diethyl peroxydicarbonate, 1-hydroxyheptyl hydroperoxide, 1-hydroxydodecyl hydroperoxide, trimeric cyclohexanone peroxide, t-butyl α-hydroxy-β,β,β-trichloroethyl peroxide.

The organic peroxides are employed in the process of this invention in catalytic quantities, i.e. not more than about 10 mole percent based upon aluminum metal. Very low concentrations are effective, a practical lower limit usually being about 0.0001 mole of organic peroxide per mole of aluminum metal. A preferred peroxide concentration range is between about 0.001 to 0.01 mole per mole of aluminum.

The following are examples which illustrate the process of this invention. Unless otherwise noted, all parts are by weight.

*Example I*

Powdered aluminum (11 parts) was ground with 0.4 part of benzoyl peroxide (0.004 mole per mole of aluminum) in a ball mill under hexane solvent (containing three percent benzene) for 12 hours to reduce the aluminum to a particle size ranging from about 1 to 25 microns and averaging about 3 microns. This slurry, containing 12 parts of hexane, the finely divided black aluminum, and the peroxide, was then placed in an autoclave and charged with a total pressure of ethylene and hydrogen (2:1 mole ratio) of 1000 p.s.i.g. The reactor was then heated to a temperature of 140° C. with stirring. The pressure in the reactor upon reaching reaction temperature was 1,735 pounds. A pressure drop in the reactor immediately occurred, indicating an immediate reaction without any induction period. The reactor was periodically recharged to the initial pressure. The reaction was continued for 4½ hours. The triethyl aluminum (60 percent) and diethyl aluminum hydride (40 percent) were thereafter recovered in excellent yield. The aluminum employed in the above reaction was a commercial grade of powdered aluminum having some oxide coating on the surface of the particles.

As a comparative run, the above was repeated exactly except that no benzoyl peroxide was employed. The aluminum powder formed shiny platelets in the ball mill which did not react with hydrogen and ethylene in the reactor under identical process conditions. The aluminum powder (without ballmilling) was also completely inactive in the above process in the absence of the benzoyl peroxide catalyst.

*Example II*

Commercial powdered aluminum (14.1 parts) was similarly treated with 0.9 part benzoyl peroxide in hexane solvent and this slurry was charged to a reactor. The reactor was heated, vented and thereafter purged of the hexane by applying a vacuum thereto. Isobutylene (20.2 parts) was then poured into the reactor. The reactor was then heated to 160° C. (above the boiling point of the isobutylene) and hydrogen was added to the reactor, giving a total pressure of 1000 p.s.i.g. The liquid-free reaction mixture was stirred and a sharp pressure drop was obtained immediately after reaching about 160° C. An excellent yield of triisobutyl aluminum and diisobutyl aluminum hydride was obtained. When this run was repeated without the benzoyl peroxide, no reaction occurred.

*Example III*

Example I was repeated except that 17 parts of chemically pure n-hexane were used during the grinding operation and an additional 100 parts of chemically pure n-hexane were charged to the reactor as the solvent. The reactor was charged with hydrogen (1000 p.s.i.g. pressure) and heated to 140° C. for five hours. This hydrogen was thereafter vented. Ethylene and fresh hydrogen were then charged to the reactor in a molar ratio of 2:1 and a total pressure of 1000 p.s.i.g. (room temperature). The reaction immediately began, as indicated by a sharp pressure drop in the reactor. An excellent yield of triethyl aluminum and diethyl aluminum hydride was obtained.

*Example IV*

Powdered aluminum (14.4 parts) was ground to a fine black dust in the presence of 0.6 part of cumene hydroperoxide in a ball mill under hexane solvent. The ball milling was conducted for a period of about twelve hours. The product, a black slurry, was then placed in an autoclave which was then charged with ethylene and hydrogen to a total pressure (at room temperature) of 1000 p.s.i.g. Ethylene and hydrogen were charged at a molar ratio of two moles of ethylene to one mole of hydrogen. The reactor was then heated to a temperature of 140° C. and the reactants were stirred continuously. An almost immediate pressure drop was noted after heating commenced and the reactor was repressurized several times with both ethylene and hydrogen. An excellent yield of triethyl aluminum and diethyl aluminum hydride was obtained in the reaction.

*Example V*

Aluminum powder (10 parts) is placed in a hammer mill with 0.2 part of di-t-butyl peroxide and the aluminum is ground for ten hours under benzene. This aluminum slurry is then transferred to an autoclave containing 100 parts of styrene. The autoclave is closed and pressurized with 2000 p.s.i.g. hydrogen pressure and heated to a temperature of 80° C. An excellent yield of tribenzyl aluminum and dibenzyl aluminum hydride is obtained.

*Example VI*

Butadiene (78 parts) and methylethyl ketone peroxide in dimethyl phthalate (1.0 part of peroxide) are placed in a reactor equipped with a cutter blade. An aluminum rod is inserted into the reactor and the rod is subdivided by the cutter blade below the surface of the liquid and while in contact with the peroxide. After subdividing approximately 15 parts of aluminum, the reactor is then pressured with 500 p.s.i.g. hydrogen and heated to a temperature of 70° C. A good yield of organo aluminum and organaluminum hydride compounds is obtained in which the organo group contains four carbon atoms. A mixture of compounds containing both saturated and unsaturated organo groups are obtained.

*Example VII*

Aluminum powder (15 parts) is placed in a vessel containing one part of cyclohexanone peroxide in tetrahydrofuran solvent. This mixture is then subjected to the action of a high-speed stirrer until the aluminum has an average particle size of below about ten microns and the mixture appears as a jet black slurry. This slurry is then placed in an autoclave and 25 parts of 1-dodecene is added. The reactor is then pressured with 500 p.s.i.g. of hydrogen and heated to a temperature of 50° C. An excellent yield of tridodecyl aluminum and didodecyl aluminum hydride is obtained.

*Example VIII*

1-butene is reacted with aluminum which has been previously treated in a ball mill with five weight percent of p-chlorobenzoyl peroxide based upon the aluminum. The inert liquid phase employed in the ball mill is dibutyl phthalate. The aluminum slurry and 1-butene are reacted at 180° C. using 700 p.s.i.g. hydrogen pressure.

An excellent yield of tri-n-butyl aluminum and di-n-butyl aluminum hydride is obtained in the reaction.

*Example IX*

Aluminum is subdivided to below two microns in a ball mill containing three weight percent of t-butyl peracetate, based upon the aluminum, under diethylene glycol dimethyl ether solvent. This aluminum slurry is then reacted with 1-octadecene at 170° C. using 1500 p.s.i.g. hydrogen pressure. An excellent yield of trioctadecyl aluminum and the corresponding monohydride is obtained.

Similar results are obtained with other alpha-olefins such as 1-decene, 1-octadecene and hydrocarbons containing up to about 25 carbon atoms. Likewise, other glycol ethers can be employed, including ethylene glycol dimethyl ether, ethylene glycol dibutyl ether, diethylene glycol dibutyl ether and tetraethylene glycol dimethyl ether with similar results.

*Example X*

The aluminum prepared as in Example I by using xylene as a solvent and diisopropylperoxy dicarbonate peroxide instead of benzoyl peroxide is reacted with 2-butene at 100° C. and 3000 p.s.i.g. hydrogen pressure. A good yield of tributyl aluminum and dibutyl aluminum hydride is obtained.

The above examples illustrate the use of a variety of solvents including aliphatic and aromatic hydrocarbons, mono- and poly-ethers, cyclic ethers, phthalates and the like. The examples, e.g. Example II, also illustrate the process conducted without a solvent. Any inert liquid can be employed in the present process with generally similar results. Other suitable solvents included heptane, decane, isooctane, toluene, naphthalene, diphenyl and the other hydrocarbons containing up to about 30 carbon atoms. Other ether solvents include dimethyl ether, diethyl ether, methylethyl ether, ethylene glycol dimethyl ether, ethylene glycol dibutyl ether, diethylene glycol methylethyl ether, triethylene glycol dimethyl ether and other ethers containing alkyl groups having up to ten carbon atoms.

The solvent concentration is not critical in this process but is best employed in concentrations of from one to twenty times the weight of the aluminum used in the reaction.

I claim:

1. The process for the manufacture of aluminum alkyls comprising reacting elemental aluminum with hydrogen and an olefin, said aluminum being in contact with at least 0.0001 mole of an organic peroxide per mole of aluminum metal, said aluminum metal having been sub-divided in the presence of said organic peroxide.

2. The process for the manufacture of aluminum alkyls comprising milling a slurry comprising elemental aluminum, an organic peroxide in a concentration of at least 0.0001 mole per mole of aluminum metal and an inert liquid to reduce the average particle size of said aluminum to below about 25 microns, thereafter reacting the said aluminum in said slurry with hydrogen and an olefin having from 2 to 20 carbon atoms in a molar ratio of from 0.01 to about 10 moles of hydrogen per mole of olefin at a temperature from about 0° to about 300° C.

3. The process of claim 2 wherein the olefin is ethylene.

4. The process of claim 2 wherein the olefin is isobutylene.

5. The process of claim 2 wherein the peroxide is benzoyl peroxide.

6. The process for the manufacture of aluminum alkyls comprising ballmilling a slurry comprising powdered aluminum and an organic peroxide in a concentration of from 0.001 to about 10 mole percent based upon said aluminum to reduce the average particle size of said aluminum to below about 25 microns, thereafter reacting said aluminum in said slurry with hydrogen and an α-olefin having from 2 to 20 carbon atoms in a molar ratio of from 0.1 to 10 moles of hydrogen per mole of α-olefin and at a temperature of 0 to 300° C., said reaction media being maintained at a pressure of from about 0 to 50,000 p.s.ig.

References Cited in the file of this patent

FOREIGN PATENTS 770,707     Great Britain _____ Mar. 20, 1957